United States Patent [19]

Gerace

[11] Patent Number: 4,490,424

[45] Date of Patent: Dec. 25, 1984

[54] NON-STRUCTURAL AND STRUCTURAL HOT-MELT ADHESIVE AND SEALANT TAPES

[75] Inventor: Michael J. Gerace, Centerville, Ohio

[73] Assignee: Protective Treatments, Inc., Dayton, Ohio

[21] Appl. No.: 491,637

[22] Filed: May 5, 1983

[51] Int. Cl.³ .......................... B32B 1/04; B32B 3/14
[52] U.S. Cl. ............................................. 428/68; 428/78;
428/377; 428/484; 428/198; 428/906; 428/494;
428/516; 428/414; 428/419; 428/421;
428/423.3; 428/423.5; 428/423.7; 428/424.2;
428/424.4; 428/424.6; 428/424.7; 428/424.8;
428/425.3; 428/425.5; 428/474.7; 428/474.9;
428/475.2; 428/517; 428/476.3; 428/476.9;
428/483; 428/520; 428/352; 428/354; 428/355;
428/347; 428/348
[58] Field of Search ............... 428/68, 484, 198, 906,
428/78, 377

[56] References Cited

U.S. PATENT DOCUMENTS

| 3,517,805 | 6/1970 | Gould | 428/198 X |
| 3,708,379 | 2/1973 | Flint | 428/58 |
| 4,001,152 | 1/1977 | Leonhardt | 428/395 X |
| 4,016,315 | 4/1977 | Szabo | 428/68 |
| 4,200,676 | 4/1980 | Capohigro et al. | 428/68 X |

Primary Examiner—Patricia C. Ives
Attorney, Agent, or Firm—Biebel, French & Nauman

[57] ABSTRACT

Articles of manufacture are disclosed which are funicularly shaped articles comprising a core of a hot-melt adhesive at least partially encased in a sheath of a plastic resin. Extended lengths of such articles can be wound upon a tubular core for each feed and delivery to a hot-melt adhesive extruder and dispensing apparatus. In a second embodiment of the invention, two or more funicularly shaped elements are encased in an outer plastic resin sheath.

15 Claims, 7 Drawing Figures

NON-STRUCTURAL AND STRUCTURAL HOT-MELT ADHESIVE AND SEALANT TAPES

BACKGROUND OF THE INVENTION

Hot-melt adhesives are being used in increasingly larger volumes in a number of industrial sectors, including the glazing, automotive, and appliance industries. The growing popularity of the hot-melt adhesives results from the many distinctive advantages that such materials offer over the two main classes of adhesives that they replace, namely, solvent-based adhesives and two-part reactive adhesives. Unlike solvent-based adhesives, hot-melt adhesives contain 100% adhesive solids and are solvent free. When applied to the locus of the adhesive bond, all of the solids are used for their functional purpose, potentially hazardous solvent emissions are eliminated, and no residual solvent is left in the adhesive. Unlike two-part reactive adhesives, which usually require careful mixing of two chemically reactive liquids, hot-melt adhesives are purchased and used as a single, homogeneous product. In addition, the hot-melt adhesives do not exhibit the shrinkage which typically is encountered in the use of two-part reactive adhesives.

At the present time, the advantages achieved by the use of hot-melt adhesives are somewhat offset by the problems of delivering the hot-melt adhesive to the locus of the adhesive bond. One commonly employed dispensing method for delivering hot-melt adhesives to the locus of the adhesive bond involves charging chunks, slugs, or bricks of the solid hot-melt formulation to an extruder in which the formulation is melted and delivered to the locus of the adhesive bond by pumps. Such types of dispensing equipment tend to be cumbersome, costly, and inconvenient to use in that a worker is required to continuously deliver the solid chunks of the hot-melt adhesive to the extruder hopper. A second method that is sometimes employed involves pumping the hot-melt adhesive from a heated liquid reservoir. Disadvantages of such delivery systems have traditionally centered about the high capital costs of such equipment, equipment failures due to the strains developed in pumping the viscous hot-melt adhesive, and an inability to consistently maintain proper operating temperatures in the drum, in the hose, and in the nozzle.

A more recently developed dispensing method for hot-melt adhesives involves equipping a small extruder with auxilliary means for feeding a rod or tape of the solid hot-melt adhesive into the extruder in response to the quantity of melted adhesive delivered from the extruder. Such equipment works well when the rods or tapes are packaged as small reels on a core. When attempts are made, however, to equip such apparatus with larger reels of the rods or tapes, operating problems develop by reason of the tendency of the rods or tapes to block or adhere to each other by reason of the contact pressures developed on the strands in the large rolls. To minimize such blocking problems, suppliers, of the large reels of the rods or tapes of the solid hot-melt adhesives have begun treating the surfaces of such strands with a powder such as mica to eliminate or minimize the blocking problems. Such efforts have been only partially successful.

In view of the difficulties noted above, there is a need in the art for the development of solid hot-melt adhesive formulations in a physical form that can be fed easily to the melting and delivery apparatus over extended periods of time.

SUMMARY OF THE INVENTION

The present invention provides a funicularly shaped article of manufacture comprising a core of a hot-melt adhesive at least partially encased in a sheath of a plastic resin. The plastic resin employed in the sheath is one which is substantially free of any tendency to adhere to itself under light to modest pressure at ambient temperature. The plastic resin employed also is one which is compatible with the hot-melt adhesive core in both its liquid and solid states. It is preferably a thermoplastic material which softens or melts at the temperature of use of the hot-melt adhesive, but may be any plastic which melts, disperses, or volatilizes so that in use the sheath is removed and access is had to the previously encased hot-melt adhesive. Extended lengths of such funicularly shaped articles can be wound upon a tubular core and used to deliver the solid or semi-solid hot-melt adhesive to hot-melt dispensing equipment of the type discussed supra. The reels of the funicularly shaped adhesive composition are substantially free of any tendency to block and cause feeding problems to the melting and delivery apparatus.

In a second embodiment of the invention, two or more funicularly shaped articles containing different components of a hot-melt adhesive formulation are bundled within plastic resin sheath. Such articles can be wound upon a tubular core for feed to melting and delivery apparatus of the type discussed supra. In this embodiment of the invention the individually funicularly shaped articles included therein need not be hot-melt adhesives in and of themselves, but can be hot-melt precursors which, when mixed together in the melt state, form an adhesive composition by chemical reaction which takes place between the two encased core materials.

DETAILED DESCRIPTION OF THE INVENTION

As used in the descriptions of the present invention, a funicularly shaped article is a three-dimensional solid article which has one dimension much larger than its other two dimensions, one dimension which is much smaller than its largest dimension, and a third dimension which also is much smaller than the largest dimension. The third dimension can be substantially the same as the smallest dimension or may be significantly larger. Typical funicularly shaped articles are rods having a circular cross-section, bars having square or rectangular cross-sections, and films or tapes which are thin and have widths larger than their thicknesses.

Figure 1:
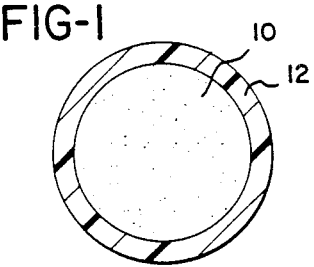
FIG. 1 is a sectional view of a rod-like funicularly shaped article of the invention.

FIG. 1 is a sectional view of a funicularly shaped article of the invention having a rod-like shape in which 10 is the hot-melt adhesive core and in which 12 is the plastic sheath.

Figure 2:
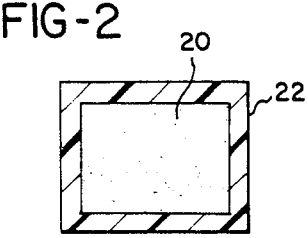
FIG. 2 is a sectional view of a bar-like funicularly shaped article of the invention.

FIG. 2 is a sectional view of a similar article having a bar-like shape in which 20 is the hot-melt adhesive core and 22 is the plastic sheath.

Figure 3:
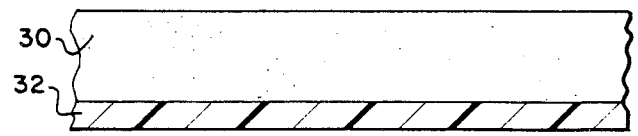
FIG. 3 is a sectional view of an article of the invention comprising a tape of a hot-melt adhesive having a thin plastic film bonded to one surface thereof.

FIG. 3 is a sectional view of a tape-like article in which a thick film of hot-melt adhesive 30 is supported by a thin plastic film 32. When this structure is wound around a tubular core, both surface of the film 30 are protected by film 32 which functions as a sheath.

Figure 4:
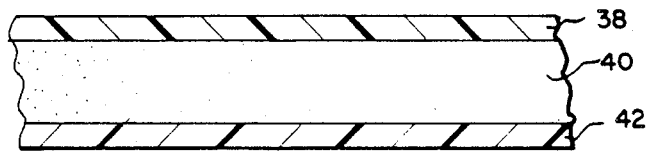
FIG. 4 is a sectional view of an article of the invention comprising a tape of a hot-melt adhesive having thin plastic films bonded to its top and bottom surfaces.

FIG. 4 illustrates an article similar to that shown in FIG. 3 and differs therefrom only in that two thin plastic films 38 and 42 (which can be identical films if desired) are bonded to the top and bottom surfaces of hot-melt adhesive film 40.

Hot-melt adhesives are materials containing one or more components and which are solid at ambient temperature but which are liquid at elevated temperatures. As such, the term generally includes sealants as well. Likewise, hot-melt adhesives as a class are also considered to include "hot-applied" adhesives, not all of which have a sharp "melt" point. In addition, in the context of the present invention, the encased hot-melt adhesives can include semi-solid materials which are anaerobically (or otherwise) activated upon rupture of the sheath to form a solid at ambient temperature and function as an adhesive.

In particular, hot-melt adhesives have the property of tightly adhering to selective materials such as metal, wood, paper, plastic, painted surfaces and the like, so that they can be employed to bond like or dissimilar materials together. Hot-melt adhesive precursors are materials which, when reacted with a second type of a hot-melt adhesive precursor, undergo a chemical or physical reaction to form a material which is a solid at ambient temperature and which tightly adheres to selective surfaces such as metals, wood, and paper. Hot-melt adhesive precursors can be either solids or liquids at ambient temperature. Hot-melt adhesive precursors can in themselves be hot-melt adhesives but, upon reaction with a second type of hot-melt adhesive precursor, form a new chemical or physical entity which is a solid at ambient temperature and functions as an adhesive.

The specific hot-melt adhesive employed as the core of the funicularly shaped articles of the invention does not in and of itself constitute an element of the invention. Multitudes of hot-melt adhesives are known in the art and/or are available from commercial sources and, with possible minor exceptions, can be employed in the practice of the present invention. The simplest of the hot-melt adhesives employed commercially are certain of the synthetic and natural waxes of commerce. Two common examples of such materials are paraffin and microcrystalline waxes derived from petroleum sources and certain natural plant waxes such a carnuba wax. Such materials are single-component hot-melt adhesives.

Hot-melt adhesives for demanding applications customarily contain two or more components which are formulated to provide certain characteristics in the adhesive such as bond strength and viscosity at the application temperature. Typically, such hot-melt adhesives will contain a synthetic or natural resin such as natural rubber, butyl rubber, low-density ethylene polymers, and a tackifying resin such as rosin, terpene resins, aliphatic hydrocarbon resins, aromatic hydrocarbon resins, and others. Tackifying resins of the type typically included in hot-melt adhesives are described in the *Kirk Othmer Encyclopedia of Chemical Technology*, Inter-Science Publishers, 2d Edition, Vol. 17, pp 475–509, the descriptions of which are incorporated herein by reference. Frequently, hot-melt adhesives also will contain as one component a hydrocarbon wax derived from petroleum sources such as a paraffin wax or a microcrystalline wax. Likewise, often at least one component of the formulation will contain a polar group including a nitrogen, sulfur, or oxygen atom.

Recently issued U.S. patents disclosing hot-melt adhesives that can be employed in the practice of the present invention are set forth below: U.S. Pat. Nos.
4,340,687
4,388,416
4,338,415
4,338,414
4,337,298
4,325,853
4,324,871
4,320,211
4,289,669

Likewise, The Technical Association of the Pulp and Paper Institute (TAPPI) periodically publishes brochures which list commercially available polymers, waxes, tackifying resins and the like which are used in formulating hot-melt adhesives. The descriptions contained in the above patents and other materials are incorporated herein by reference.

The plastic resin employed in the fabrication of the sheath which encases the core material of the funicularly shaped articles of the invention can be essentially any plastic resin which meets three criteria. First, it must melt, soften, volatilize or otherwise readily disperse at the temperature of use of the hot-melt adhesive so that the sheath is removed and access is had to the adhesive itself. Second, it must be substantially free of any significant tendency to adhere to itself under light to modest pressure at ambient temperature. Third, the resin must be sufficiently compatible with the hot-melt adhesive in both the liquid and solid states so that it has no significant adverse effect on the rheological properties of the hot-melt adhesive in the melt state or upon the adhesive properties of the hot-melt adhesive in the solid state. Preferred is a thermoplastic resin.

The selection of the proper thermoplastic resin for use as the sheath in the funicularly shaped article of the invention will pose no problem for those skilled in the art once the particular hot-melt adhesive has been selected for use as the core material. The first factor that requires consideration in the selection of the thermoplastic resin is the inherent tackiness or lack thereof in the thermoplastic resin. The second parameter to be considered is the compatability of the thermoplastic resin with the hot-melt adhesive in both the liquid and solid states. Fortuitously, many thermoplastic resins which have little or no tackiness at ambient temperature can be included as a beneficial functional component in the hot-melt adhesive itself. Such resins are emminently well-suited for use as the sheath material. Prime examples of such thermoplastic resins are ethylene copolymers prepared by copolymerizing ethylene with acrylic monomers containing a nitrogen or oxygen atom therein. Examples of such comonomers include vinyl acetate, acrylic and methacrylic acid, acrylonitrile, methacrylonitrile, and esters of acrylic and methacrylic acid, particularly the lower alkyl esters thereof such as the methyl, ethyl, butyl, and like alkyl esters.

The plastic resin employed as the sheath material in the articles of the invention can be formulated to further reduce any inherent tackiness that such resin may have by incorporating and dispersing therein certain known materials which are identified in the art as anti-block agents. The most widely used anti-block for incorporation into ethylene copolymers of the type described in the paragraph above is a diatomaceous earth material sold under the trade designation "Superfloss."

The funicularly shaped articles of the invention can be prepared by several processes known in the art. The preferred method for preparing the articles of the invention illustrated in FIGS. 1, 2, 3 and 4 is by coextrusion techniques in which multiple extruders feed two or more materials into separate channels communicating with two or more die orifices. To prepare the article shown in FIG. 1, the hot-melt adhesive is extruded through a rod die with the plastic sheath being extruded through an annulus contiguous to the center rod opening of the die. The article of FIG. 2 can be prepared in the identical manner as the article shown in FIG. 1 with the single exception that the center die orifice has a bar-shaped center orifice in lieu of the rod-shaped circular orifice. The articles shown in FIGS. 3 and 4 can be prepared employing coextrusion film dies of the type widely employed in the industry. The articles of FIGS. 3 and 4 can also be formed by extruding the hot-melt adhesive onto a preformed plastic film or preformed films of each may be laminated together by known techniques.

The funicularly shaped articles of the invention can be prepared by alternate techniques. By way of specific example, the articles shown in FIGS. 1 and 2 can be prepared by passing a rod or bar of the solid hot-melt adhesive through a cross-head die and extruding the sheath of plastic resin about the center core of the ultimate article. The equipment used in such a process will be of the type employed to extrusion coat resin sheaths onto metal wire. In yet another techinque, the core of the solid hot-melt adhesive can be dip-coated with a solvent solution of the plastic resin employed to form the sheath. This latter technique suffers a shortcoming in that the solvent can diffuse into the hot-melt adhesive core and can have an adverse effect on the ultimate adhesive properties. As such the dip coat composition is restricted to plastic materials which go into solution and to solvents which can be used with those materials. Likewise, dip coating tends not to provide as uniform a coating as the encasement method described above and therefore the sheath may tend to have gaps or pin holes in it which may be deleterious. Consequently, it should be used only in situations in which alternate manufacturing methods are not viable.

Examples of combinations of commercially available adhesives which are hot-melt or can be blended to form hot-melt ones and commercially available plastic resins which can be employed together to prepare preferred embodiments of the present invention are those set forth in Table 1, below.

TABLE 1

| Adhesive Material | Sheath Material |
|---|---|
| Acrylics | ABS |
| Fluorocarbons | Acetol |
| Ionomers | Acrylic |
| Neoprene | Alkyl |
| Nitrile Rubber | Cellulosic |
| Vinyl Plastisol | Polyolefin |
| Vinyl Phenolic | Epoxy |
| Natural Rubber | Fluoroplastics |
| Block Copolymers | Furan |
| Amino Resins | Ionomer |
| Nylon | Melamine Formaldehyde |
| Epoxy | Melamine Phenolic |
| Polyolefin | Nitrile Resin |
| Polybutadiene | Nylon |
| Butyl Rubber | Phenolic |
| Polyvinyl Acetate | Phenylene Oxide |
| Ethylene Copolymers | Polyamine |
| Polyvinyl Acetal | Polyamide |
|  | Polyaryl Ester |
| Polyamides | Polyaryl Ether |
| Polyimide | Polybutudiene |
| Isobutylene | Polybutylene |
| Polyester | Polycarbonate |
| Polysulfide | Polyester |
| Reclaim Rubber | Polymethylpentene |
| Resorcinol | Polyphenylene sulfide |
| SBR | Polystyrene |
| Silicone | Sulfones |
| Urea | Polyurethanes |
| Urethane | Silicones |
| Vinyl | Silicone Epoxy |
| Polyimines | Vinyl Copolymer & Copolymers |
| Melamines | Urea |
| Cyanoacrylate | Chloroplastics |

In a second embodiment of the invention, an article of manufacture is prepared which comprises a plurality (customarily two) of funicularly shaped articles encased in an outer plastic sheath. The first of the funicularly shaped articles includes a core of a first hot-melt adhesive precursor which may or may not be encased in a first plastic sheath. A second of the funicularly shaped articles includes a core of a second hot-melt adhesive precursor which may or may not be encased in a second plastic sheath. The two hot-melt adhesive precursors included in the article are selected so that they are interractive with each other to form an adhesive that is a solid at ambient temperature. If individual plastic sheaths are not used on the first and second funicularly shaped articles, then they must be spaced within the outer sheath so that the hot-melt adhesive precursors do not contact one another until the time of use. This may be accomplished by inserting an inert spacer between the two materials or simply by adhering each to opposite side walls of the sheath (see FIG. 5) so that they are spaced apart and constrained from contact during normal handling. On the other hand, it is possible to use individual plastic sheaths around each of the funicularly shaped articles and then wrap them in an outer sheath (see FIGS. 6 and 7). In that case, the funicularly shaped articles need not be kept otherwise separated since the individual sheaths for each will serve that purpose.

Each of the plastic resins included in each of the sheaths is selected to be compatible with the melt formed by heating the article of manufacture to an elevated temperature. In addition, each of the plastic resins included in each of the sheaths is selected to be compatible in the solid state with the hot-melt adhesive formed by the interraction of the hot-melt adhesive precursors.

As noted earlier herein, a hot-melt adhesive precursor is a material which, when reacted with a second type of hot-melt adhesive precursor, undergoes a chemical or physical reaction to form a material which is a solid at ambient temperature and which tightly adheres to selective surfaces such as metals, wood, plaster, painted surfaces and paper. In addition, the chemical or physical product formed by reaction of the two hot-melt adhesive precursors will have the characteristic of remaining liquid at an elevated temperature for a sufficient period of time so that the heated adhesive can be applied to the locus of the adhesive bond in the melt state. A feature of this system is that once applied, adhesive properties start to develop as it cools and, then, the final physical strength of the bond developes upon full cure of the hot-melt adhesive. This is of particular advantage in certain end-use situations where first temporary and then permanent bonds are sought.

Multitudes of hot-melt adhesive precursors are known and reported in the art. Conventionally, one of the precursors (hereinafter identified as the first precursor) will include in its chemical structure a chemically reactive functional group containing a sulfur, nitrogen, or oxygen atom. Frequently, the functional group will be a mercaptan group, a hydroxy group, a carboxyl group, an epoxy group, an amine group, or an isocyanate group. Another of the hot-melt adhesive precursors (hereinafter identified as the second precursor will have a composition similar to but not identical with the first precursor.

The second precursor will differ from the first precursor in that the functional group included therein will differ from the functional group contained in the first precursor.

It is possible to select the two precursors in such a way that low molecular weight or low crosslink materials are used which have good low temperature properties, but which because encased in a sheath are easily handled. The selection of these precursor materials can, then, be made so that upon reaction a cured adhesive is formed which has good creep resistance without the use of brittle tackifiers (a property which is difficult to achieve with hot-melt adhesives having good low temperature features.)

The two precursors will be selected so that when the two precursors are intimately admixed in the melt state, the functional groups contained in the structures of the two precursors will chemically react to form a new chemical entity having strong adhesive properties. By way of example, when the first precursor includes isocyanate groups in its structure, the second precursor can include in its structure chemically functional groups reactive with isocyanate groups, e.g., hydroxyl groups, carboxyl groups, or amine groups. Similarly, when the first precursor contains epoxy groups in its structure, the second precursor can contain in its structure hydroxyl groups, carboxyl groups, or amine groups. In another system of interest, the first precursor can contain anhydride groups in its structure with the second precursor containing hydroxyl groups or amine groups in its structure. Preferred is butyl rubber with isoprene unsaturation that is capable of cross-linking, as a first precursor and a polyisobutylene material with latent curatives, such as a sulfur, peroxide or isocyanate compound, as the second precursor. As will be readily recognized by those skilled in the adhesive art, the proportions of the two hot-melt adhesive precursors will be selected so that the reaction product formed therefrom will have good adhesive properties. The precise proportions of the two precursors to be employed will be dictated by the functional equivalents per unit weight contained in the two precursors.

Examples of combinations of precursors that can be employed together for use in the second embodiment of the invention are set forth in Table 2, below.

TABLE 2

| First Hot-Melt Precursor | Second Hot-Melt Precursor |
| --- | --- |
| Epoxy Resin (1) | EVAL Resin (2) |
| Epoxy Resin (1) | EAA Resin (3) |
| Epoxidized Novalac Resin (4) | Abietic Acid |
| E-MA Copolymer (5) | EVAL Resin (2) |
| TDI Adduct of EAA (6) | Eval Resin (2) |
| Butyl Rubber (7) | Curative (8) |

(1) Typically prepared by reacting bisphenol-A with epichlorohydrin. Commercially available under the Epon trade designation.
(2) Ethylene-vinyl alcohol copolymer obtained by partial hydrolysis of an ethylene-vinyl acetate copolymer. Commercially available.
(3) Ethylene acrylic acid copolymer.
(4) Obtained by epoxidizing a phenolformaldehyde resin. Commercially available.
(5) Ethylene-maleic anhydride copolymer.
(6) Obtained by reacting two chemical equivalents of toluene diisocyanate with one chemical equivalent of an ethylene-acrylic acid copolymer.
(7) Butyl rubber with isoprene unsaturation.
(8) Polyisobutylene containing a sulfur curing agent.

As can be seen from the above examples, the precursors can be chosen so that the resultant adhesive is either a soft elastomeric material or a more rigid solid. In some cases it may be advantageous to add additional post-cure applications of heat, pressure or both to achieve or accelerate cure to the ultimate state.

In some circumstances, a conventional hot-melt adhesive free of components containing interreactive functional groups may be fabricated by encasing a plurality of funicularly shaped articles in an outer plastic sheath. With such articles, the first funicularly shaped article will contain one or more of the components of the ultimate hot-melt adhesive, and the second funicularly shaped article will contain another component of the ultimately formed hot-melt adhesive.

The articles described above can be prepared by several processes known in the art. The article illustrated in FIG. 5 contains a first rod-like funicularly shaped element 44 (which must be a solid or semi-solid) is a first hot-melt adhesive precursor. The second rod-like funicularly shaped element 46 (which also must be a solid or semi-solid) is a second hot-melt adhesive precursor. Both of the rod-like funicularly shaped elements 44 and 46 are encased, in a spaced-apart relationship, in an outer sheath 48 of plastic polymer. Such structures can be prepared by extruding the shaped elements 44 and 46 from separate, but adjacent dies and, then, co-extruding outer sheath 48 thereon. The extruded sheath material may also be present in the space between elements 44 and 46 to serve as the spacer or an inert spacer material may be inserted.

Figure 6:
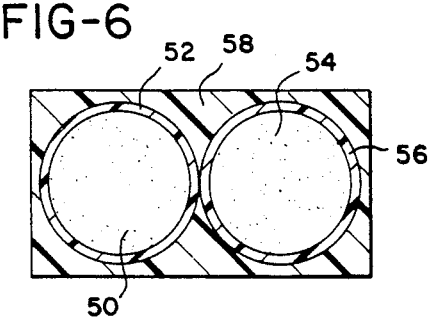
FIG. 6 is a sectional view of an article of the invention in which two sheathed rod-like funicularly shaped articles are encased within a plastic resin outer sheath.

The articles illustrated in FIG. 6 contains a first rod-like funicularly shaped element including a core 50 (which may be solid, semi-solid or liquid) of a first hot-melt adhesive precursor encased in a plastic sheath 52. The second rod-like funicularly shaped element includes a core 54 (which also may be solid, semi-solid or liquid) of a second hot-melt adhesive precursor encased in a plastic sheath 56. Both of the rod-like funicularly shaped elements are encased in an outer sheath 58 of plastic polymer. Such structures can be prepared by passing the two elements through a cross-head die and extruding the sheath of plastic resin thereon.

Figure 5:
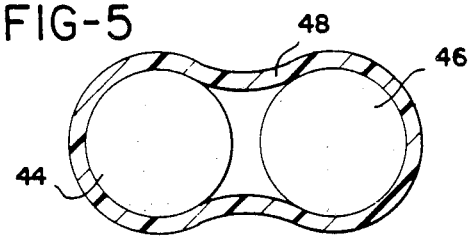
FIG. 5 is a sectional view of an article of the invention in which two rod-like funicularly shaped articles are encased within a plastic resin sheath.

Alternatively, the articles of FIGS. 5 and 6 can be made by placing or extruding a series of alternating precursor elements (solid or semi-solid unsheathed ones or sheathed ones of any type) on a film of plastic outer sheath material, laying another film of plastic outer sheath material thereover and, then, heat sealing and severing between couplets of funicularly shaped elements to form individual articles.

Figure 7:
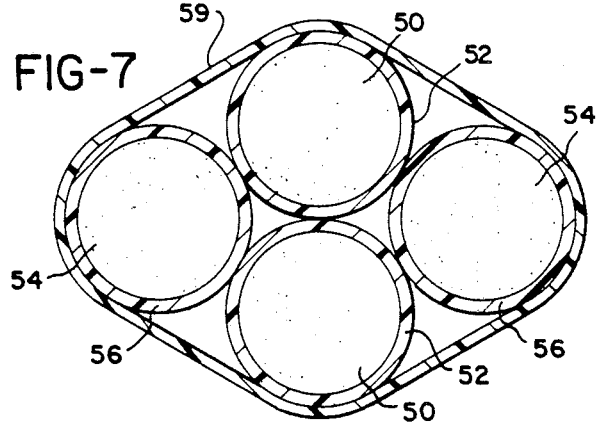
FIG. 7 is a sectional view of an article of the invention in which four sheathed rod-like funicularly shaped articles are encased with a plastic resin outer sheath.

The article illustrated in FIG. 7 contains a bundle of four funicularly shaped articles that are encased with a plastic film. The numerical legends 50, 52, 54, and 56 have the same meaning as described earlier for FIG. 6, 59 being the thermoplastic film. The bundle of the funicularly shaped articles is gathered together and then wrapped tightly with thermoplastic film employing wrapping equipment of the type employed to wrap paper about electrical cable used for house wiring.

While the articles of manufacture herein described, and the methods for using these articles, constitute preferred embodiments of this invention, it is to be understood that the invention is not limited to these precise articles and methods, and that changes may be made in either without departing from the scope of the invention which is defined in the appended claims.

What is claimed is:

1. A funicularly shaped article of manufacture comprising a core of hot-melt adhesive encased in a sheath of a plastic resin; the plastic resin sheath being one which melts, softens, volatilizes or otherwise disperses at the temperature of use of the hot-melt adhesive; the plastic resin sheath also being substantially free of any tendency to adhere to itself under light to modest pressure at ambient temperature; the plastic resin included in said sheath being compatible with the hot-melt adhesive in both its liquid and solid states.

2. An article of claim 1 comprising a rod of thermoplastic hot-melt adhesive encased in a sheath of a thermoplastic resin and wound on a tubular core.

3. An article of claim 2 in which the thermoplastic resin in the sheath is an ethylene copolymer having copolymerized therein one or more monomers from the group consisting of vinly acetate, acrylic acid, methacrylic acid, acrylonitrile, methacrylonitrile, an ester of acrylic acid, and an ester or methacrylic acid.

4. An article of manufacture comprising a plastic film bonded to a hot-melt adhesive tape and wound on a tubular core so that both surfaces of said hot-melt adhesive tape are protected by said plastic film, the plastic film being one which melts, softens, volatilizes or otherwise disperses at the temperature of use of the hot-melt adhesive and being substantially free of any tendency to adhere to either itself or the hot-melt adhesive coating under light to modest pressure at ambient temperature; the plastic resin included in said plastic film being compatible with the hot-melt adhesive in both its liquid and solid states.

5. An article of claim 4 comprising a thermoplastic hot-melt adhesive tape bonded to a thermoplastic resin film.

6. An article of claim 5 in which the plastic resin in the film is an ethylene copolymer having copolymerized therein one or more monomers from the group consisting of vinyl acetate, acrylic acid, methacrylic acid, acrylonitrile, methacrylonitrile, an ester of acrylic acid, and an ester of methacrylic acid.

7. An article of manufacture comprising a trilaminar film construction including a first outer plastic film, a core sheet of a hot-melt adhesive and a second outer plastic film so as to encase said core sheet between said first and second outer plastic films; said first and second outer plastic films being ones which melt, soften, volatilize or otherwise disperse at the temperature of use of the hot-melt adhesive and being substantially free of any tendency to adhere to each other under light to modest pressure at ambient temperature; the plastic resin included in said first plastic film being compatible with the hot-melt adhesive in both its liquid and solid states; the plastic resin included in said second outer plastic film being identical to the plastic resin included in said first plastic film or being a thermoplastic resin which is compatible with the hot-melt adhesive and the first plastic resin in both of their liquid and solid states.

8. An article of claim 7 comprising a thermoplastic hot-melt adhesive tape laminated between two thermoplastic resin films.

9. An article of claim 7 in which the thermoplastic resin in each of the films is an ethylene copolymer having copolymerized therein one or more monomers from the group consisting of vinyl acetate, acrylic acid, methacrylic acid, acrylonitrile, methacrylonitrile, an ester of acrylic acid, and an ester of methacrylic acid.

10. An article of manufacture comprising a plurality of funicularly shaped elements encased in an outer plastic resin sheath; a first of the funicularly shaped elements comprising a solid or semi-solid first hot-melt adhesive precursor; a second of the funicularly shaped elements comprising a solid or semi-solid hot-melt adhesive precursor; said first and second elements being spaced apart and being interractive with each other to form an adhesive that is a solid at ambient temperature, said plastic sheath being one which melts, softens, volatilizes or otherwise disperses at the temperature of use of the hot-melt adhesive precursors and being compatible with the melt formed by heating the article of manufacture to an elevated temperature as well as compatible in the solid state with the hot-melt adhesive formed by the interraction of the first and second hot-melt adhesive precursors.

11. An article of claim 10 wherein said plastic sheath is a thermoplastic one substantially free of any tendency to adhere to itself under light to modest pressure at ambient temperature.

12. An article of claim 11 in which the thermoplastic resin in the sheath is an ethylene copolymer having copolymerized therein one or more monomers from the group consisting of vinly acetate, acrylic acid, methacrylic acid, acrylonitrile, methacrylonitrile, an ester of acrylic acid, and an ester or methacrylic acid.

13. An article of manufacture comprising a plurality of funicularly shaped elements encased in an outer thermoplastic resin sheath; a first of the funicularly shaped elements comprising a core of a first hot-melt adhesive precursor encased in a first plastic sheath; a second of the funicularly shaped elements comprising a core of a second hot-melt adhesive precursor encased in a second plastic sheath; the article of manufacture wherein:
    (a) the first and second hot-melt adhesive precursors are interractive with each other to form an adhesive that is a solid at ambient temperature,
    (b) each of the plastic resins in each of the sheaths is one which melts, softens, volatilizes or otherwise disperses at the temperature of use of the hot-melt adhesive precursors, (c) each of the plastic resins in each of the sheaths is compatible with the melt formed by heating the article of manufacture to an elevated temperature, and (d) each of the plastic resins in each of the sheaths is compatible in the solid state with the hot-melt adhesive formed by the interraction of the first and second hot-melt adhesive precursors.

14. An article of claim 13 in which the same thermoplastic resin is included in each of the sheaths.

15. An article of claim 14 in which the thermoplastic resin included in the sheaths is an ethylene copolymer having copolymerized therein one or more monomers from the group consisting of vinyl acetate, acrylic acid, methacrylic acid, acrylonitrile, methacrylonitrile, an ester of acrylic acid, and an ester of methacrylic acid.

* * * * *

UNITED STATES PATENT AND TRADEMARK OFFICE
CERTIFICATE OF CORRECTION

PATENT NO. : 4,490,424

DATED : December 25, 1984

INVENTOR(S) : Michael Gerace

It is certified that error appears in the above-identified patent and that said Letters Patent is hereby corrected as shown below:

Col. 2, line 57, delete "p"; line 58, new paragraph should start with "Fig. 7".

Col. 8, line 22, in Table 2, "Ethylene acrylic" should be --Ethylene-acrylic--.

Col. 9, lines 28-68, claims 1-6 should be cancelled.

On the title page, "15 Claims" should read -- 9 Claims --.

Signed and Sealed this

Twenty-eighth Day of May 1985

[SEAL]

Attest:

DONALD J. QUIGG

Attesting Officer     Acting Commissioner of Patents and Trademarks